(12) United States Patent
Lejin P J

(10) Patent No.: US 12,488,093 B2
(45) Date of Patent: Dec. 2, 2025

(54) GUI EVENT AUTHENTICATION METHODS AND SYSTEMS USING A WEB APPLICATION FIREWALL

(71) Applicant: Salesforce, Inc., San Francisco, CA (US)

(72) Inventor: Jose Lejin P J, Karnataka (IN)

(73) Assignee: Salesforce, Inc.

( * ) Notice: Subject to any disclaimer, the term of this patent is extended or adjusted under 35 U.S.C. 154(b) by 0 days.

(21) Appl. No.: 18/620,669

(22) Filed: Mar. 28, 2024

(65) Prior Publication Data

US 2025/0307380 A1    Oct. 2, 2025

(51) Int. Cl.
*G06F 21/54* (2013.01)
*G06F 21/56* (2013.01)

(52) U.S. Cl.
CPC ............ *G06F 21/54* (2013.01); *G06F 21/566* (2013.01)

(58) Field of Classification Search
CPC .......... G06F 21/50; G06F 21/52; G06F 21/54; G06F 21/56; G06F 21/566; G06F 21/84; G06F 21/88
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |

(Continued)

*Primary Examiner* — Boris D Grijalva Lobos
(74) *Attorney, Agent, or Firm* — Ingrassia Fisher & Lorenz, LLP

(57) ABSTRACT

Database systems and methods are provided for securing actions associated with graphical user interface (GUI) elements within an instance of a web application using a web application firewall. One method of securing an action associated with a GUI element within a GUI display of an instance of a web application involves monitoring a location associated with the GUI element associated with the action within the GUI display of the instance of the web application, detecting an event associated with the GUI element within the location of the GUI display, capturing event metadata associated with the event within a context of the instance of the web application, authenticating the event when the event metadata corresponds to authentication configuration metadata associated with the GUI element, and providing event data corresponding to the event to the GUI element to initiate the action in response to authenticating the event.

20 Claims, 6 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

GUI EVENT AUTHENTICATION METHODS AND SYSTEMS USING A WEB APPLICATION FIREWALL

TECHNICAL FIELD

One or more implementations relate to the field of database systems, and more specifically, to a web application firewall residing between an application server and a client to secure actions associated with graphical user interface (GUI) elements within an instance of a web application.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features.

Web applications often include graphical user interface (GUI) elements, such as buttons, links, menus and/or the like, which are manipulable by an end user to trigger or otherwise perform actions. However, clickjacking, bot generated clicks, vulnerable web browser extension triggered actions or other techniques may be employed by a malicious third party to trigger actions associated with a GUI element within a web application without the end user's knowledge or awareness. Accordingly, it is desirable to provide protections for web applications against inauthentic triggering of GUI element actions that were not intended by a genuine end user.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
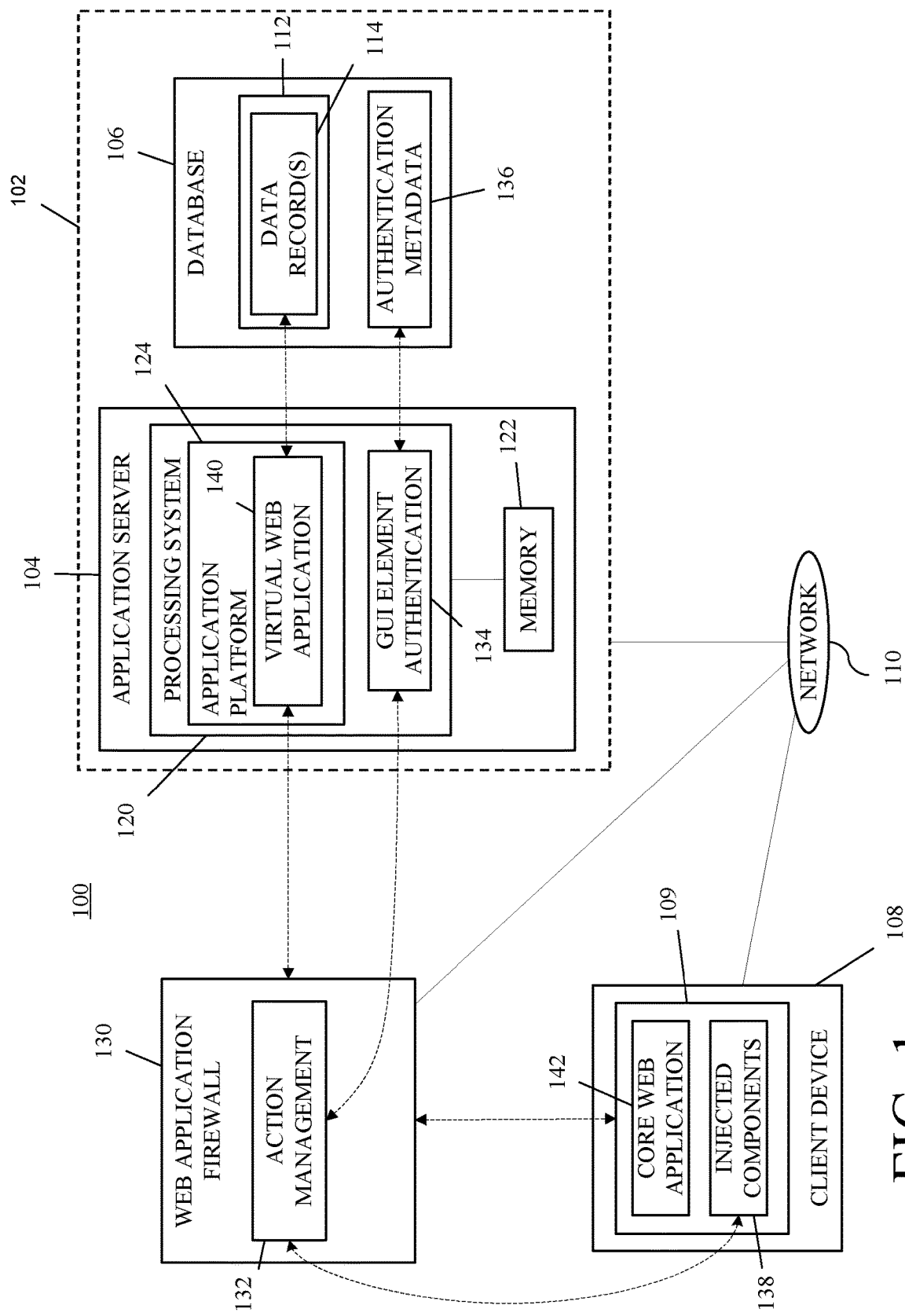
FIG. 1 is a block diagram illustrating a computing system according to some exemplary implementations.

The following description describes implementations for securing actions associated with graphical user interface (GUI) elements within a GUI display associated with a web application. In exemplary implementations, a web application firewall (WAF) residing between an application server and a client provides a service that monitors a designated subset of GUI elements within a GUI display, which may be designated by an administrator associated with the web application. As described in greater detail below, before sending code, data or other information for an instance of the web application code to a client, the WAF injects or otherwise provides executable code to the client, which, in turn, is executed by a web browser or other application at the client to provide one or more services or components at the client-side that monitors for events associated with GUI elements of a GUI display presented within the web browser or other application in connection with the web application. For example, a developer or other administrative user associated with the web application may select or otherwise identify which GUI elements within a particular GUI display should be monitored for potential malicious or inauthentic actions (e.g., because those GUI elements are capable of triggering actions that are potentially significant or critical). The WAF service creates, injects or otherwise generates executable code provided to the client, which, in turn is executed by the web browser or other application at the client-side to generate corresponding client-side components within the web application running in the web browser to monitor locations within a GUI display that are associated with the GUI element(s) selected for monitoring and detect an event associated with a monitored GUI element at a respective monitored location of the GUI display of that instance of the web application.

When an event associated with a monitored GUI element is detected, a client-side component captures event metadata associated with the detected event that characterizes the context of the instance of the web application at or before the occurrence of the event and provides the captured event metadata to the WAF service for authentication, while withholding the event data from the GUI element and/or the web application until the detected event is authenticated. In this regard, when the detected event is not authenticated, the client-side injected component prevents the event data associated with the detected event from being provided to or otherwise executed on by the GUI element and/or the web application, thereby inhibiting performance of the action associated with the GUI element. Additionally, one or more notifications may be generated and provided to a developer or other administrative user associated with the web application that includes the detected event data and potentially other information characterizing the context of the web application at or before occurrence of the event for further analysis or handling when the detected event is not authenticated. In various implementations, a notification may also be generated or otherwise provided at the client-side (e.g., by one of the injected components within the web browser) to notify the end user at the client of potential malicious activity.

To authenticate a detected event as a genuine user event indicative of a desire to initiate the action associated with the monitored GUI element, in response to receiving captured event metadata, the WAF service utilizes a GUI element authentication service to authenticate the detected event based on the captured event metadata. In this regard, in connection with defining or designating the GUI elements to be monitored, a developer or other administrative user may define or otherwise provide various criteria which may be utilized to authenticate events with respect to a particular monitored GUI element. The authentication criteria is then stored or otherwise maintained as authentication configuration metadata associated with the particular GUI element capable of being retrieved or accessed by the GUI element authentication service to authenticate detected events. Thus, when the captured event data matches or otherwise corresponds to authentication configuration metadata associated with the particular GUI element, the GUI element authentication service notifies the WAF service that the detected event is authenticated, which, in turn, results in the WAF service notifying a corresponding client-side injected component to release the hold on the detected event and provide the event data to the GUI element and/or the web application to initiate the action associated with the monitored GUI element as per web application logic in response to authenticating the event.

FIG. 1 depicts an exemplary computing system 100 capable of securing actions associated with GUI elements within a GUI display of an instance of a web application 140 provided from a server 104 of a database system 102 to a client application 109 at a client device 108 over a communications network 110 (e.g., the Internet or any sort or combination of wired and/or wireless computer network, a cellular network, a mobile broadband network, a radio network, or the like). It should be appreciated that FIG. 1 is a simplified representation of a computing system 100 and is not intended to be limiting.

In one or more exemplary implementations, the database system 102 includes one or more application servers 104 that support an application platform 124 capable of providing instances of virtual web applications 140, over the network 110, to any number of client devices 108 that users may interact with to view, access or obtain data or other information from one or more data records 114 maintained in one or more data tables 112 at a database 106 or other repository associated with the database system 102. For example, a database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual web applications 140 based upon data from a common database 106 that is shared between multiple tenants, which may alternatively be referred to herein as a multi-tenant database. Data and services generated by the virtual web applications 140 may be provided via the network 110 to any number of client devices 108, as desired, where instances of the virtual web application 140 may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records 114 maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receivers, transceivers, wired network interface controllers (e.g., an Ethernet adapter), wireless adapters or any other suitable network interfaces that support communications to/from the network 110 coupled thereto. The application server 104 also includes or otherwise accesses a data storage element 122 (or memory), and depending on the implementation, the memory 122 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services that are configurable to subject matter described herein.

The client device 108 generally represents an electronic device coupled to the network 110 that may be utilized by a user to access an instance of the virtual web application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual web application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. The illustrated client device 108 executes or otherwise supports a client application 109 that communicates with the application platform 124 provided by the processing system 120 at the application server 104 to access an instance of the virtual web application 140 using a networking protocol. In some implementations, the client application 109 is realized as a web browser or similar local client application executed by the client device 108 that contacts the application platform 124 at the application server 104 using a networking protocol, such as the hypertext transport protocol (HTTP). In this manner, in one or more implementations, the client application 109 may be utilized to access or otherwise initiate an instance of a virtual web application 140 hosted by the database system 102, where the virtual web application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual web application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual web application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual web application 140, which may include custom objects and/or standard objects. For example, an administrator user associated with a particular resource owner may utilize an instance of a virtual web application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

Still referring to FIG. 1, the computing system 100 includes a web application firewall 130 that generally represents the software, hardware, and/or other components configurable to reside between the application server 104, the application platform 124 and/or the virtual web application 140 and the client devices 108 attempting to access instances of the virtual web application 140 and/or the database system 102 (e.g., via a web browser or other client application 109). In this regard, the web application firewall 130 may be configurable by an administrator associated with the database system 102 and/or the virtual web application 140 to monitor and filter requests, responses, and/or other network traffic to/from the database system 102 and/or the virtual web application 140.

In exemplary implementations described herein, the web application firewall 130 includes or otherwise supports an action management service 132 that interacts with a GUI element authentication service 134 to securely initiate actions associated with selected GUI elements within the context of an instance of the virtual web application 140 by authenticating events attempting to trigger those actions prior to enabling or providing the event to the virtual web application 140. In this regard, in exemplary implementations, the GUI element authentication service 134 is configurable to allow an administrator user to interact with and configure GUI element event authentication metadata 136 for selected GUI elements over the network 110 using a web browser or similar client application 109 at a client device 108 being utilized by that administrator user.

As described in greater detail below, an administrative user associated with a virtual web application 140 (e.g., the web application administrator or owner) may utilize a web browser or similar client application 109 at the client device 108 to access the GUI element authentication service 134 to input or otherwise provide authentication metadata 136 or other authentication criteria associated with respective GUI displays of the web application 140. For example, the GUI element authentication service 134 may support or otherwise provide one or more application programming interfaces (APIs), command line interfaces (CLIs), GUI displays that allow an administrator to configure the authentication metadata 136 for the GUI elements to be monitored. In this regard, the authentication metadata 136 may include information including, but not limited to, identification of the particular GUI elements within a respective GUI display of the virtual web application 140 to be monitored (e.g., an HTML element identifier or path or other label that can be utilized to identify the GUI element when the web application 140 is running in the web browser on client device) along with additional selection criteria or other contextual information that may be utilized to differentiate or distinguish a genuine user-initiated event with respect to a particular GUI element from inauthentic, malicious, unauthorized, or other unintended event. For example, the authentication metadata 136 may include contextual authentication criteria including a sequence of one or more events, GUI element selections, GUI displays and/or the like that are expected to anticipate a genuine or authentic user-initiated event with respect to a particular GUI element (e.g., the sequence of selections or GUI displays a user would typically be expected to navigate through before making a particular selection), and/or contextual authentication criteria characterizing the current state of the GUI display concurrent to a genuine or authentic user-initiated event (e.g., whether the web browser or other window, panel or view including the GUI element is in focus, the relative on-screen position or location of the GUI element, what other windows, panels or views are concurrently presented, and/or the like).

It should be noted that although FIG. 1 depicts the GUI element authentication service 134 as being implemented at an application server 104 of the database system 102 and the authentication metadata 136 as being stored or otherwise maintained in a database 106 of the database system 102, in practice, the GUI element authentication service 134 may be implemented at the web application firewall 130 or another server or system located on the network 110 that is separate and distinct from the database system 102. For example, in some implementations, the GUI element authentication service 134 may be implemented at a third-party system or other cloud-computing system or platform external to the database system 102. Accordingly, the subject matter described herein is not intended to be limited to any particular manner for implementing the GUI element authentication service 134 or any particular location for storing and maintaining the authentication metadata 136. Moreover, it will be appreciated that the subject matter described herein is not limited to any particular type, number or configuration of authentication metadata 136 that may be defined or utilized in connection with a practical implementation.

Still referring to FIG. 1, when a user of a client device 108 requests an instance of the virtual web application 140 via the web browser or other client application 109, the network request is passed through the web application firewall 130, which interacts with the application platform 124 and/or the application server 104 of the database system 102 to retrieve the code, data, files or other information for the corresponding client-side components 142 to be executed or otherwise implemented by the client application 109 to support the virtual web application 140 from the client side (e.g., HTML, CSS, XML, JavaScript and/or other web page files), which may alternatively be referred to herein as the core web application components. Prior to providing the core web application components 142 to the client device 108, the action management service 132 at the web application firewall 130 utilizes one or more identifiers associated with the requested web page of the virtual web application 140 to interact with the GUI element authentication service 134 to identify the presence of any monitored GUI elements associated with the GUI display of the requested page of the virtual web application 140.

When one or more GUI elements selected for monitoring are identified, the GUI element authentication service 134 provides information identifying the respective monitored GUI elements associated with the respective GUI display to the action management service 132. In response to receiving the information identifying the monitored GUI elements, the action management service 132 injects one or more client-side components 138 that are configurable to support monitoring those GUI elements and corresponding interactions with the action management service 132 and the GUI element authentication service 134, as described in greater detail below. For example, when returning the HTML file for the requested web page associated with the virtual web application 140 to the client device 108, the action management service 132 may inject a script tag with a script file or other executable code in the header of the HTML file that is configurable to cause the client application 109 to execute the code, data or other information associated with the script tag to generate the injected components 138 within the client application 109 at the client device 108 concurrently to executing the core web application components 142 to provide the corresponding web page GUI display for the virtual web application 140 at the client device 108.

When the web browser or other client application 109 loads the instance of the virtual web application 140, the client application 109 executes the code for the injected components 138 within the header of the web page file to generate the injected components 138 at the client side prior to executing the core web application components 142 for generating the corresponding web page GUI display for the virtual web application 140 at the client device 108. In exemplary implementations, the injected components 138 include a virtual security plane component, which generally represents a software component that automatically creates a hidden span layer with a lower z-index value such that the hidden span layer underlies the GUI elements of the web page GUI display for the virtual web application 140 and does not interfere with the user experience associated with the running virtual web application 140. The injected components 138 also include a UI element detector component, which generally represents a software component that listens or otherwise monitors for the presence of monitored GUI elements presented on the display at the client device 108, for example, by monitoring the web page document object model (DOM) for identifiers associated with the GUI elements selected for monitoring and the corresponding GUI displays or other views containing those GUI elements. When the UI element detector identifies presence of a monitored GUI element being displayed, the UI element detector notifies a UI element clamper injected component 138, which generally represents a software component that creates hidden virtual span elements that are attached to or otherwise associated with the virtual security plane layer at corresponding positions, locations or regions associated with the monitored GUI element, such that the hidden virtual span element underlies and overlaps or is otherwise collocated with the monitored GUI element.

Figure 2:
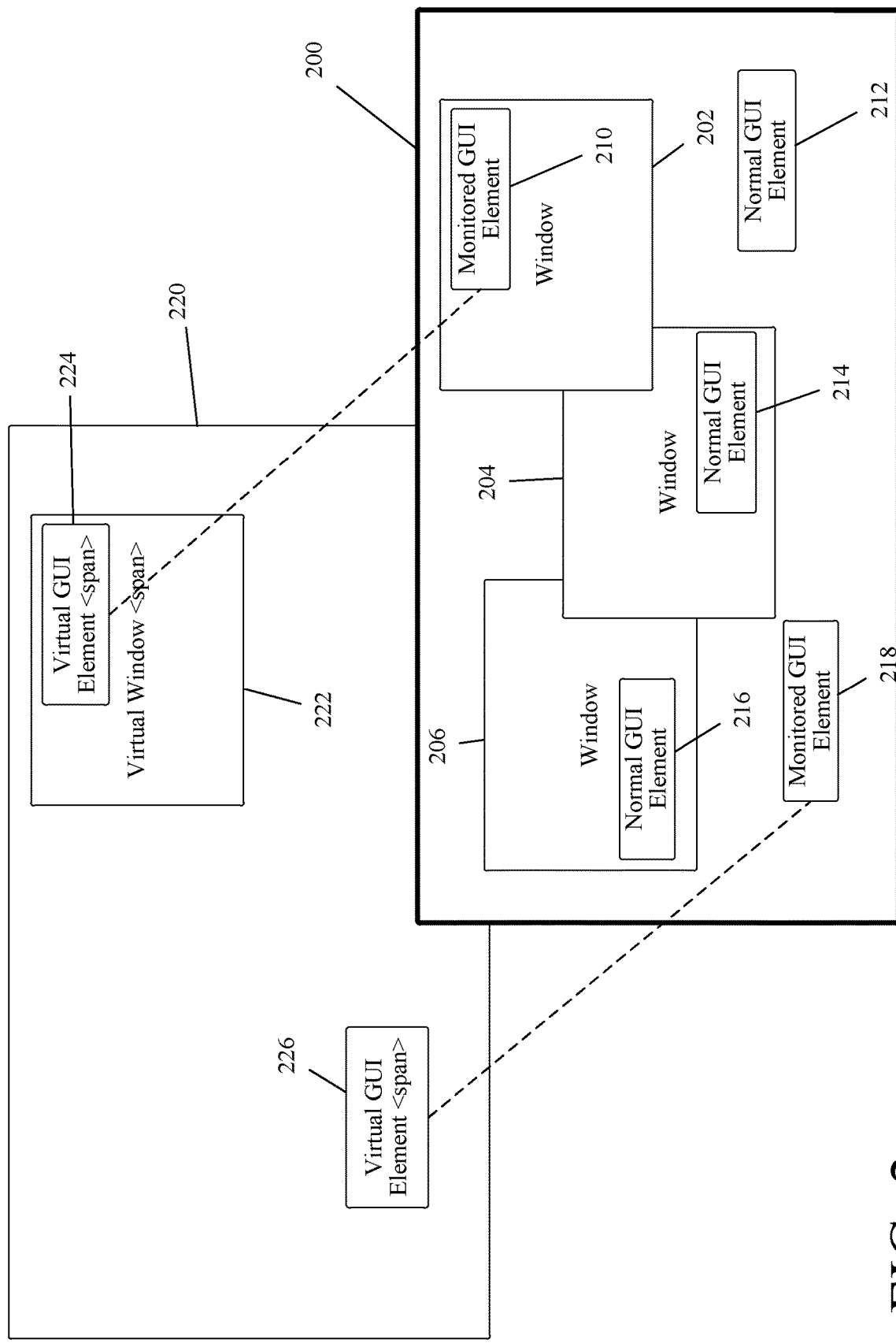
FIG. 2 depicts an exemplary web page graphical user interface (GUI) display depicting the relationship between monitored GUI elements and underlying hidden span layers for authenticating events associated with monitored GUI elements according to some exemplary implementations.

FIG. 2 depicts an exemplary implementation of a web page GUI display 200 for a virtual web application 140 suitable for presentation within a browser window of a web browser or other client application 109. The web page GUI display 200 includes a plurality of container windows 202, 204, 206 and GUI elements 210, 212, 214, 216, 218 corresponding to core web application components 142 that are interactive or otherwise manipulable by a user of the client device 108 to interact with the virtual web application 140 and/or the database system 102. In this regard, FIG. 2 depicts a scenario where the web page GUI display 200 includes a pair of GUI elements 210, 218 selected for monitoring that have associated authentication metadata 136, where the remaining GUI elements 212, 214, 216 on the particular GUI display 200 have not been designated for monitoring.

Referring to FIGS. 1-2, when the web page GUI display 200 is loaded, the virtual security plane component 138 automatically creates a hidden span layer 220 with a lower z-index than the background of the web page GUI display 200 generated by the core web application components 142 such that the span layer 220 overlaps and underlies the web page GUI display 200. The UI element detector component 138 listens or otherwise monitors the DOM for the web page GUI display 200 to automatically detect or otherwise identify when the container window 202 containing the monitored GUI element 210 and the monitored GUI element 218 are created in the browser DOM, and in response, automatically notifies the UI element clamper injected component 138. The UI element clamper injected component 138 generates a corresponding hidden virtual span container window 222 at a region within the span layer 220 that is collocated with or otherwise aligned with container window 202 in the z-direction to overlap and encompass the area of the container window 202, and in a similar manner, generates a corresponding hidden virtual GUI element 224 at a region within the virtual container window 222 that is collocated with or otherwise aligned with the monitored GUI element 210 in the z-direction to overlap and encompass the area of the monitored GUI element 210 and another hidden virtual GUI element 226 that is collocated with or otherwise aligned with the monitored GUI element 218 in the z-direction to overlap and encompass the area of the monitored GUI element 218.

Still referring to FIGS. 1-2, an action controller injected component 138 supports or otherwise implements GUI clamping logic (e.g., via JavaScript event handler functions) that creates and maintains associations between monitored GUI elements 202, 210, 218 and their corresponding virtual GUI elements 222, 224, 226 and gets triggered whenever the web browser or other client application 109 detects or otherwise generates an event with respect to a respective on of the monitored GUI elements 202, 210, 218 (e.g., in response to a user clicking on or within a region associated with a respective monitored GUI element 202, 210, 218). In this regard, the action controller injected component 138 prevents the detected event from triggering any callback functions or other actions associated with the core web application component(s) 142 associated with the respective monitored GUI element 202, 210, 218 associated with the relative position or location of the event within the web page GUI display 200 until the event has been authenticated as a probable genuine or intended user interaction event. At the same time, any events with respect to an unmonitored GUI element 204, 206, 212, 214, 216 bypasses the clamping logic and the action controller by virtue of the absence of a corresponding GUI element within the virtual span layer 220 such that the event data for those events is provided directly to the callback functions of those corresponding core web application component(s) 142 for generating requests for initiating corresponding actions by the virtual web application 140 at the database system 140.

Figure 3:
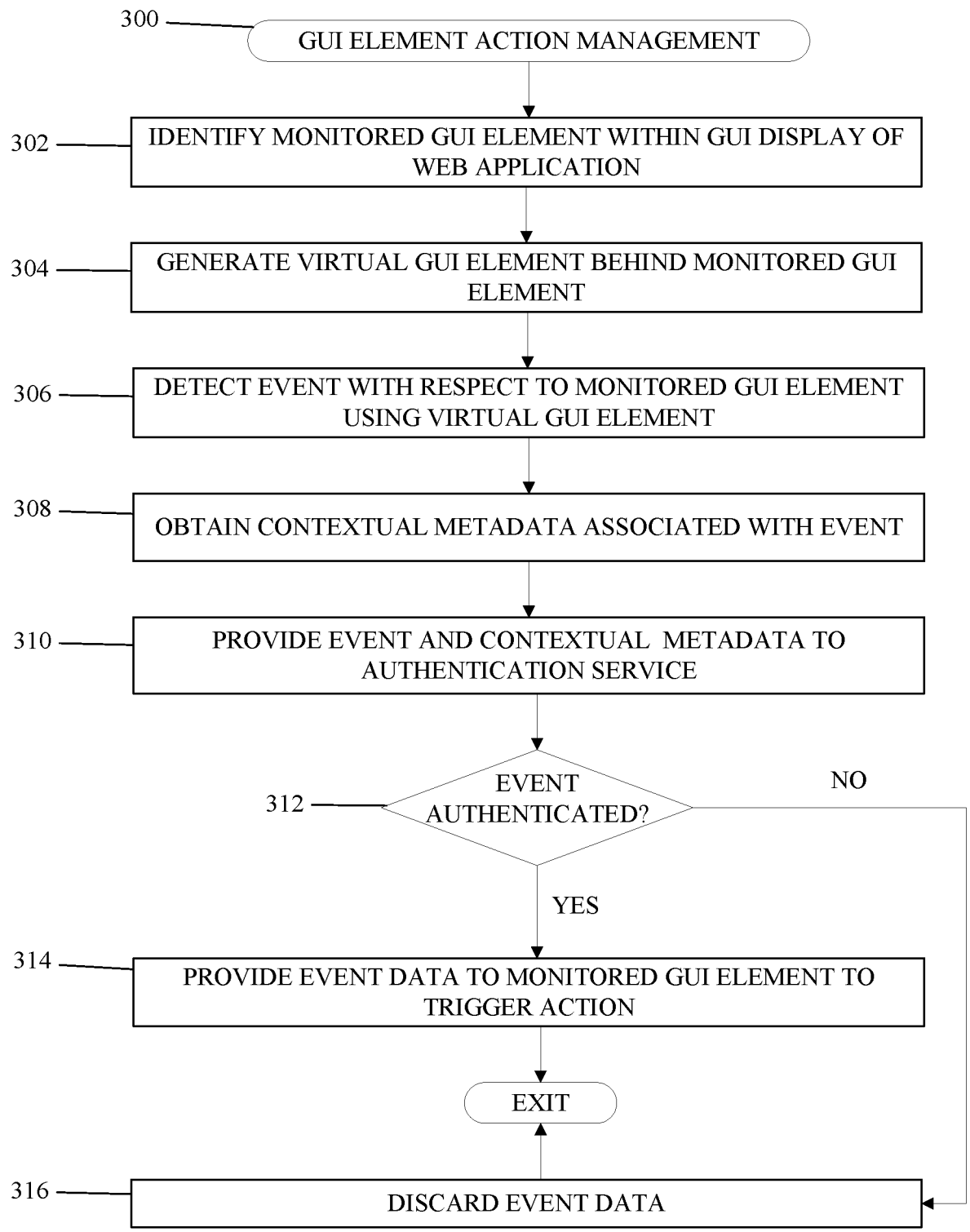
FIG. 3 is a flow diagram illustrating a GUI element action management process suitable for implementation in connection with the web application firewall in the computing system of FIG. 1 according to some example implementations.

FIG. 3 depicts an exemplary GUI element action management process 300 suitable for implementation by a web application firewall (e.g., web application firewall 130) to authenticate events or other interactions with selected GUI elements before initiating any potentially significant actions in the context of a virtual web application and perform additional tasks, functions, and/or operations described herein. For illustrative purposes, the following description may refer to elements mentioned above in connection with FIG. 1. It should be appreciated that the GUI element action management process 300 may include any number of additional or alternative tasks, the tasks need not be performed in the illustrated order and/or the tasks may be performed concurrently, and/or the GUI element action management process 300 may be incorporated into a more comprehensive procedure or process having additional functionality not described in detail herein. Moreover, one or more of the tasks shown and described in the context of FIG. 2 could be omitted from a practical implementation of the GUI element action management process 300 as long as the intended overall functionality remains intact.

Referring to FIG. 3 with continued reference to FIGS. 1-2, in exemplary implementations, the GUI element action management process 300 is initiated, triggered or otherwise begins when a particular instance of a virtual web application that includes one or more GUI elements previously designated for monitoring is accessed or otherwise requested by a client device. In response to receiving a request for an instance of the virtual web application, the GUI element action management process 300 detects or otherwise identifies the presence of one or more monitored GUI elements within a web page GUI display of the virtual web application, and in response, automatically generates one or more virtual hidden GUI elements behind or otherwise underlying the monitored GUI element(s) for clamping events associated with the monitored GUI element(s) (tasks 302, 304).

For example, as described above, when the web application firewall 130 receives a request for a virtual web application 140, the action management service 132 communicates with the GUI element authentication service 134 to obtain any predefined authentication metadata 136 associated with that particular instance of the virtual web application 140 (e.g., using one or more identifiers associated with the user of the client device 108, the requested virtual web application 140, the tenant, organization or other resource owner associated with the requested virtual web application 140, the tenant, organization or other resource owner associated with the user of the client device 108, and/or the like). When the action management service 132 receives authentication metadata 136 identifying one or more monitored GUI elements associated with the requested virtual web application 140, the action management service 132 automatically generates the client-side injected components 138 provided to the client application 109 as part of a response to the request that includes the core web application components 142 for generating a web page GUI display responsive to the request.

Referring again to FIG. 3, the GUI element action management process 300 continues by detecting or otherwise identifying occurrence of an event with respect to a monitored GUI element using the underlying virtual GUI element and automatically capturing or otherwise obtaining contextual metadata associated with the event (tasks 306, 308). For example, as described above, when the web browser detects an event, the GUI clamping logic associated with the action controller injected component 138 determines whether the relative position or location associated with the event corresponds to a monitored GUI element based on the relative position or location associated with the event being encompassed by an underlying hidden virtual GUI element. When the action controller injected component 138 determines the event should be clamped or otherwise held for authentication, the action controller injected component 138 is configured to capture or otherwise obtain contextual metadata that characterizes the current and/or preceding state(s) of the virtual web application at the client device 108. For example, the action controller injected component 138 may utilize the browser web application DOM, DOM element current properties, DOM event listener, the browser event log, and/or the like to obtain contextual information identifying whether or not a container window including the particular GUI element is in focus, the relative position or location of the container window and/or the particular GUI element on the display of the client device 108, an identifier associated with the particular user interface device associated with the event (e.g., mouse, keyboard, touch panel, and/or the like), information characterizing the container windows or other views concurrently presented within the current GUI display, information characterizing one or more preceding events (e.g., events associated with unmonitored GUI elements), information characterizing one or more preceding GUI displays associated with the virtual web application and/or the like. For example, action controller injected component 138 may include code or other injected logic configurable to cause the action controller injected component 138 to listen for events in a particular HTML element of our interest being monitored, and in response to an event, generate a corresponding event reflected at the underlying hidden virtual GUI element to clamp or hold the event until authentication can be completed.

Still referring to FIG. 3, the GUI element action management process 300 transmits or otherwise provides the captured event data and contextual metadata to an authentication service while temporarily withholding the captured event data from the monitored GUI element until determining whether or not the detected event is authenticated (tasks 310, 312). When the event is authenticated, the GUI element action management process 300 provides the captured event data to the callback function(s) or other core web application components associated with the monitored GUI element to enable the instance of the virtual web application to initiate, trigger or otherwise perform one or more actions responsive to the detected event (task 314). On the other hand, when the event is not authenticated, the GUI element action management process 300 discards or otherwise ignores the event data and fails to provide the event data to the callback function(s) or other core web application components associated with the monitored GUI element, thereby inhibiting or preventing performance of actions responsive to the detected event (task 316). Moreover, in some implementations, the GUI element action management process 300 may be configurable to automatically log or otherwise record the captured event data and contextual metadata associated with the unauthenticated event and provide that information to the GUI element authentication service 134 for further processing and/or analysis. For example, the GUI element authentication service 134 may be configurable to automatically generate a user notification for the developer or other administrator user that defined the authentication metadata 136 for the respective instance of the virtual web application 140 that includes the captured event data and contextual metadata for manual analysis and/or validation. In this regard, when the developer or other administrator user determines that the unauthenticated event was in fact genuine or otherwise should have been authorized, the developer or other administrator user may update the authentication metadata 136 to include the captured event data and contextual metadata for subsequently authenticating similar events. In yet other implementations, the GUI element authentication service 134 may support machine learning or other artificial intelligence techniques for analyzing the captured event data and contextual metadata for unauthenticated events to automatically and dynamically update the authentication metadata 136 to adapt to observed user interactions assessed to be genuine.

Still referring to FIGS. 1-3, as described above, to determine whether or not the detected event is authenticated, the action management service 132 transmits a corresponding request or query to the GUI element authentication service 134 that includes the captured event data and contextual metadata along with one or more identifiers associated with the monitored GUI element to be authenticated. The GUI element authentication service 134 verifies the the captured event data and contextual metadata matches, satisfies or otherwise corresponds to the respective authentication metadata 136 associated with that particular monitored GUI element, and provides corresponding notification of authentication of the detected event back to the action management service 132. In response to receiving indication from the GUI element authentication service 134 that the detected event is authenticated, the action management service 132 provides a corresponding response to the action controller injected component 138 to release the temporary hold on the event and provide the captured event data to the callback function(s) or other core web application components 142 associated with the monitored GUI element to trigger or otherwise initiate one or more actions in the context of the virtual web application 140. In this regard, the core web application component(s) 142 may generate one or more requests, commands or other instructions to be provided to the application platform 124 and/or the virtual web application 140 to initiate performance of one or more actions at the database system 102.

Figure 4:
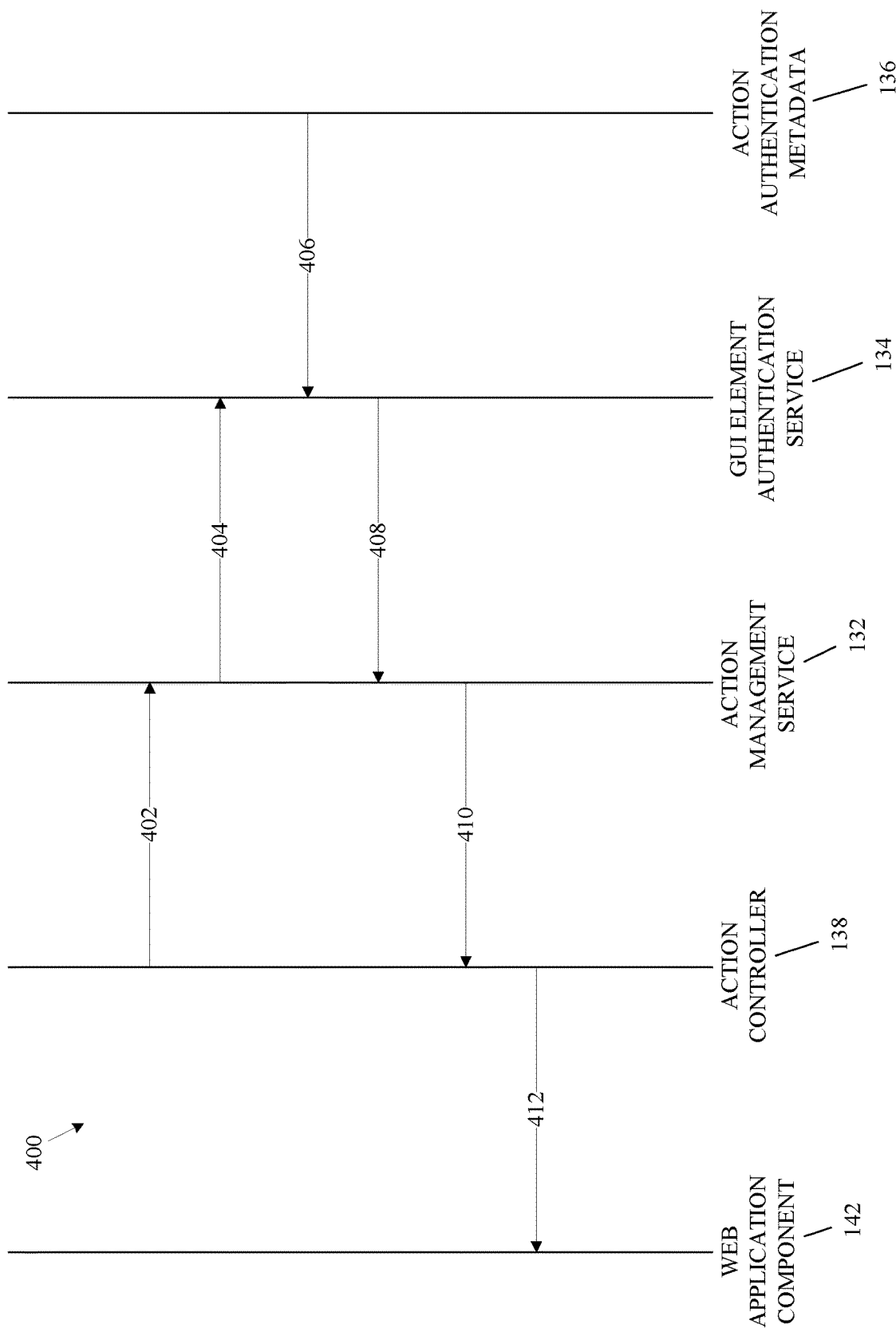
FIG. 4 is a timing diagram illustrating an exemplary sequence of communications in connection with the GUI element action management process of FIG. 3 according to some example implementations.

FIG. 4 depicts an exemplary sequence 400 of communications within the computing system 100 of FIG. 1 in connection with an exemplary implementation of the GUI element action management process 300 in response to an event with respect to a monitored GUI element. For example, referring to FIG. 2, the monitored GUI element 210 may be realized as a button associated with performance of an operationally significant or critical action at or via the database system 102 (e.g., resetting, reformatting or powering off a particular device, reverting configurations or monitoring other settings, and/or the like), for which an administrator or developer has defined authentication metadata 136 to constrain or limit circumstances in which the action(s) can be initiated. Thus, in response to a click event associated with the critical action button 210, the action controller injected component 138 may capture contextual metadata identifying a mouse associated with the client device 108 as the user interface associated with the click event, identifying the container window 202 including the critical action button 210 as currently active or otherwise in focus, and/or the like.

The action controller injected component 138 transmits or otherwise provides 402 an authentication request including the captured event data and contextual metadata to the action management service 132 over the network 110, which, in turn, transmits or otherwise provides 404 a corresponding authentication request to the GUI element authentication service 134 over the network 110 that includes information identifying the particular virtual web application 140 associated with the authentication request. The GUI element authentication service 134 utilizes the identifying information provided by the action management service 132 to query or otherwise retrieve 406 the action authentication metadata 136 for that particular GUI display of that particular virtual web application 140 (e.g., from the database 106). The GUI element authentication service 134 compares the captured event data and contextual metadata to the stored action authentication metadata 136 for the critical action button 210 to verify or otherwise confirm that the captured event data and contextual metadata matches, satisfies, or otherwise corresponds to the stored action authentication metadata 136 for the critical action button 210.

When the captured event data and contextual metadata matches the stored action authentication metadata 136, the GUI element authentication service 134 transmits or otherwise provides 408 an authentication response to the action management service 132 that indicates the detected event has been authenticated. In response, the action management service 132 transmits or otherwise provides 410 a corresponding authentication response to the action controller injected component 138 that indicates the detected event has been authenticated. Once authenticated, the action controller injected component 138 provides 412 the captured event data to the callback function(s) or other core web application component(s) 142 associated with the critical action button 210. In response, the core web application component(s) 142 may generate one or more requests for initiating the operationally significant or critical action associated with the critical action button 210 and transmit or otherwise provide the request(s) to the application platform 124 and/or the virtual web application 140 via the web application firewall 130 to initiate performance of the action(s) associated with the critical action button 210. In this manner, the action(s) associated with the critical action button 210 are only initiated at the database system 102 after the web application firewall 130 has authenticated or verified that the event triggering the action(s) is most likely a genuine user-initiated event, thereby preventing malicious techniques such as clickjacking and the like from initiating the operationally significant or critical action(s) at the database system 102.

Still referring to FIGS. 1-4, in exemplary implementations, one of the injected components 138 is configurable to support a separate WebSocket communication channel to support simultaneous bidirectional communications over a single Transmission Control Protocol (TCP) connection between the action management service 132 at the web application firewall 130 and the injected components 138 to reduce latency, and hence helps accelerate authentication of the event with respect to the monitored GUI element. This reduced latency improves end user experience since the event on the monitored GUI element is hold for authentication, such that the minor delay in GUI element action performance may be imperceptible to the end user. In addition, a dedicated WebSocket communication channel helps facilitate reduced latency in situations where the web app is already busy with other network transactions. For example, in one implementation, the action controller injected component 138 is configurable to automatically create or otherwise establish a web socket communication channel over the network 110 between the action controller injected component 138 and the action management service 132 when a web page GUI display associated with the virtual web application 140 is loaded that includes a monitored GUI element. Thereafter, the action controller injected component 138 utilizes the WebSocket communication channel to transmit or otherwise provide authentication requests that includes the captured event metadata for a particular interaction with that monitored GUI element. In response to receiving indication from the GUI element authentication service 134 that the detected event is authenticated, the action management service 132 provides a corresponding response to the action controller injected component 138 via the web socket communication channel. In this manner, the authentication requests and responses between the action controller injected component 138 and the action management service 132 are transmitted with reduced latency, thereby allowing events to be authenticated in a manner that is imperceptible to a client end user.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
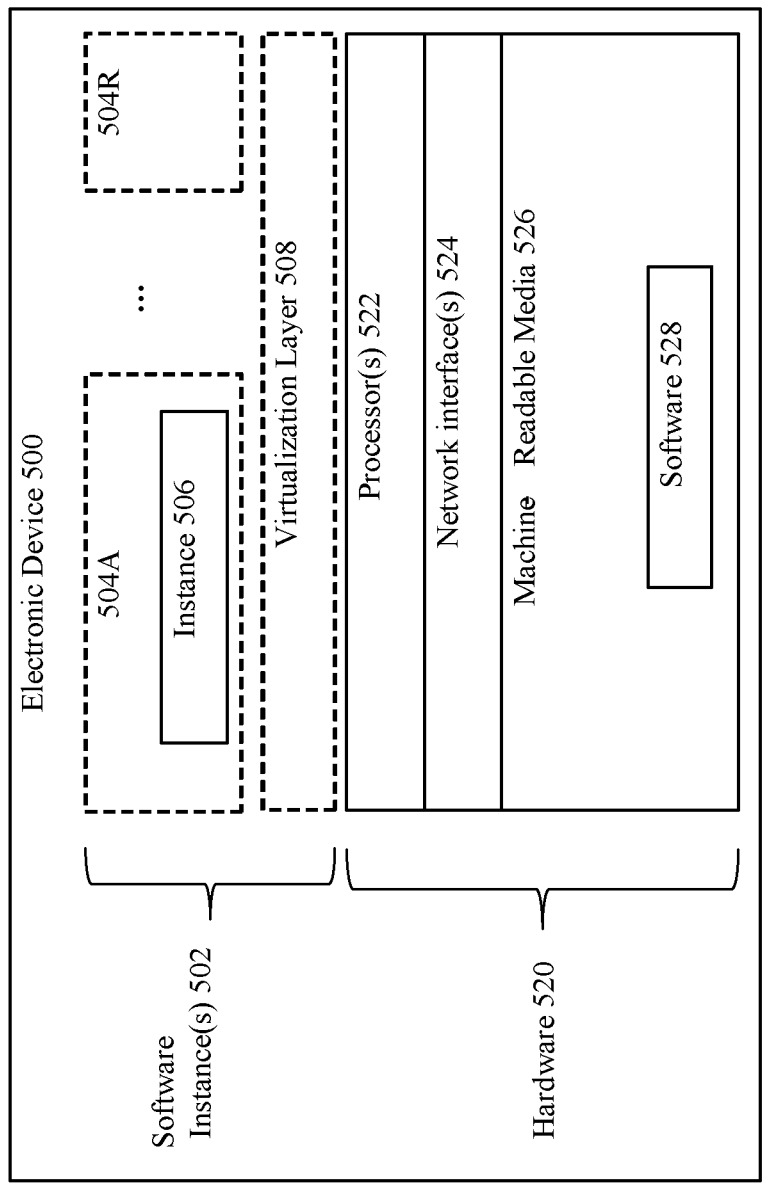
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients, web application firewall services and client-side services may be implemented in one or more electronic devices 500. In one implementation: 1) each of the clients is implemented in a separate one of the electronic devices 500 (e.g., in end user devices where the software 528 represents the software to implement clients to interface directly and/or indirectly with the web application firewall services and/or client-side services (e.g., software 528 represents a web browser, a native client, a portal, a command-line interface, and/or an application programming interface (API) based upon protocols such as Simple Object Access Protocol (SOAP), Representational State Transfer (REST), etc.)); 2) the web application firewall services and/or client-side services is implemented in a separate set of one or more of the electronic devices 500 (e.g., a set of one or more server devices where the software 528 represents the software to implement the web application firewall services and/or client-side services); and 3) in operation, the electronic devices implementing the clients and the web application firewall services and/or client-side services would be communicatively coupled (e.g., by a network) and would establish between them (or through one or more other layers and/or or other services) connections for submitting requests to the web application firewall services and/or client-side services. Other configurations of electronic devices may be used in other implementations.

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Figure 5B:
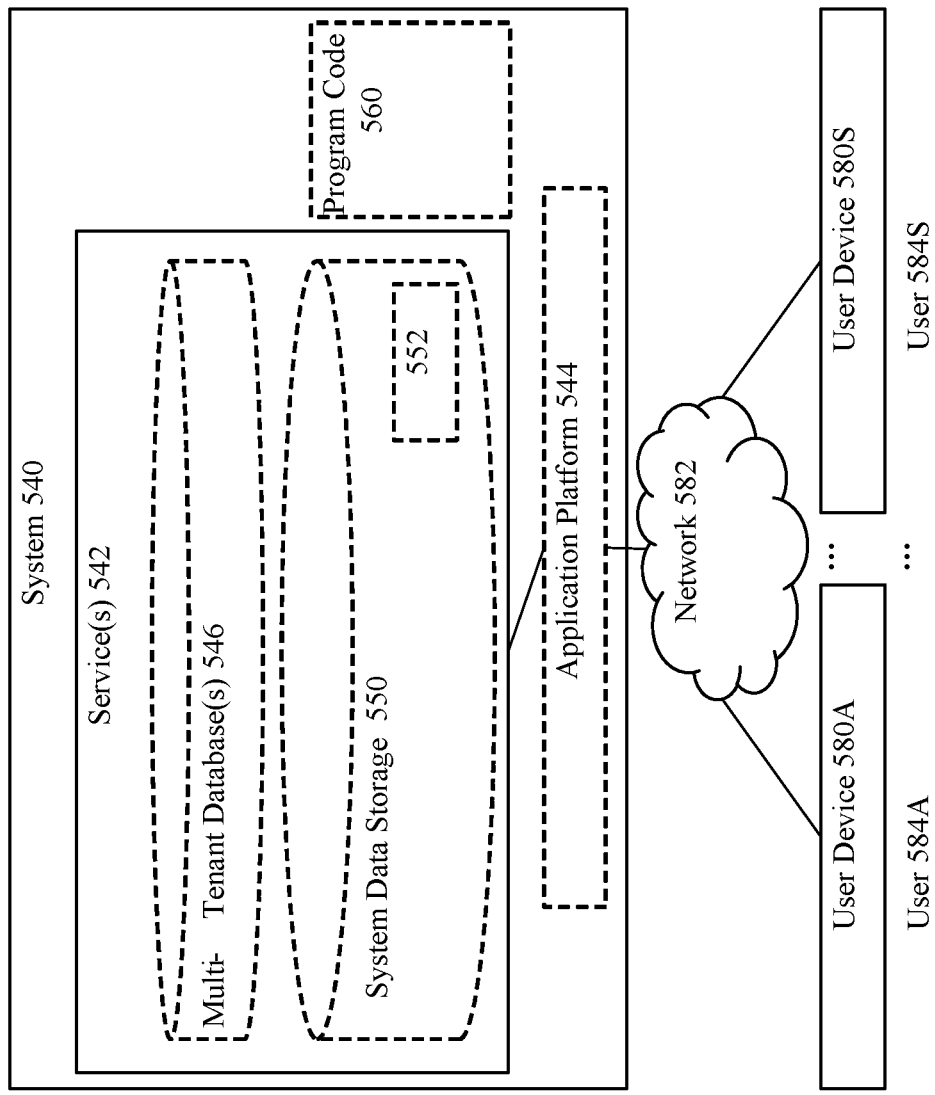
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including web application firewall services and/or client-side services. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the web application firewall services and/or client-side services, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of securing an action associated with a graphical user interface (GUI) element within a GUI display of an instance of a web application, the method comprising:
    monitoring a location associated with the GUI element associated with the action within the GUI display of the instance of the web application;
    detecting an event associated with the GUI element within the location of the GUI display;
    capturing event metadata associated with the event within a context of the instance of the web application;
    authenticating the event when the event metadata corresponds to authentication configuration metadata associated with the GUI element; and
    providing event data corresponding to the event to the GUI element to initiate the action in response to authenticating the event.

2. The method of claim 1, further comprising automatically establishing a communication channel between an injected component at a client and an action management service at a web application firewall coupled to a network, the web application firewall residing between an application server providing the instance of the web application and the client presenting the GUI display of the instance of the web application, wherein authenticating the event comprises:

receiving, by the web application firewall, an authentication request including the event metadata from the injected component via the communication channel; and providing, by the web application firewall, an authentication response to the injected component including an indication the event is authenticated via the communication channel.

3. The method of claim 2, wherein automatically establishing the communication channel comprises the injected component automatically creating the communication channel in accordance with a WebSocket communications protocol in response to determining the GUI display includes the GUI element to be monitored.

4. The method of claim 1, wherein:
authenticating the event comprises:
receiving, by a web application firewall coupled to a network between an application server providing the instance of the web application and a client presenting the GUI display of the instance of the web application, the event metadata from the client;
providing, by the web application firewall, the event metadata to an authentication service to compare the event metadata to authentication metadata associated with the GUI element; and
receiving, by the web application firewall, indication of authentication of the event from the authentication service; and
providing the event data comprises the web application firewall providing a second indication of the authentication of the event over the network to a component at the client to provide the event data to a function associated with the GUI element.

5. The method of claim 1, further comprising:
receiving, by a web application firewall on a network, a request from a client for the instance of the web application to be provided from an application server;
obtaining, by the web application firewall, a response from the application server comprising one or more core components of the web application; and
automatically injecting, by the web application firewall, one or more injected components into the response prior to providing the response to the client, wherein the client executes the response to generate the one or more injected components and the one or more core components of the web application at the client.

6. The method of claim 1, wherein:
monitoring the location comprises generating a span layer encompassing the location associated with the GUI element within a browser application at a client; and
detecting the event comprises identifying when a second location associated with an input is encompassed by the span layer.

7. The method of claim 1, further comprising temporarily withholding the event data from the GUI element until after the event is authenticated.

8. At least one non-transitory machine-readable storage medium that provides instructions that, when executed by at least one processor, are configurable to cause the at least one processor to perform operations comprising:

monitoring a region associated with a graphical user interface (GUI) element within a GUI display of an instance of a web application;
detecting an event associated with the GUI element within the region of the GUI display;
capturing event metadata associated with the event within a context of the instance of the web application;
authenticating the event when the event metadata corresponds to authentication configuration metadata associated with the GUI element; and
providing event data corresponding to the event to the GUI element to initiate an action associated with the GUI element in response to authenticating the event.

9. The non-transitory machine-readable storage medium of claim 8, wherein the instructions are configurable to cause the at least one processor to automatically establish a communication channel between an injected component at a client and an action management service at a web application firewall coupled to a network, the web application firewall residing between an application server providing the instance of the web application and the client presenting the GUI display of the instance of the web application, wherein authenticating the event comprises:

receiving, by the web application firewall, an authentication request including the event metadata from the injected component via the communication channel; and providing, by the web application firewall, an authentication response to the injected component including an indication the event is authenticated via the communication channel.

10. The non-transitory machine-readable storage medium of claim 9, wherein the injected component is configurable to automatically create the communication channel in accordance with a WebSocket communications protocol in response to determining the GUI display includes the GUI element to be monitored.

11. The non-transitory machine-readable storage medium of claim 8, wherein:
authenticating the event comprises:
receiving, by a web application firewall coupled to a network between an application server providing the instance of the web application and a client presenting the GUI display of the instance of the web application, the event metadata from the client;
providing, by the web application firewall, the event metadata to an authentication service to compare the event metadata to authentication metadata associated with the GUI element; and
receiving, by the web application firewall, indication of authentication of the event from the authentication service; and
providing the event data comprises the web application firewall providing a second indication over the network to a component at the client to provide the event data to a function associated with the GUI element.

12. The non-transitory machine-readable storage medium of claim 8, wherein the instructions are configurable to cause the at least one processor to:
receive, at a web application firewall on a network, a request from a client for the instance of the web application to be provided from an application server;
obtain, by the web application firewall, a response from the application server comprising one or more core components of the web application; and
automatically inject, by the web application firewall, one or more injected components into the response prior to providing the response to the client, wherein the client executes the response to generate the one or more injected components and the one or more core components of the web application at the client.

13. The non-transitory machine-readable storage medium of claim 8, wherein:
   monitoring the region comprises generating a span layer encompassing a location associated with the GUI element within a browser application at a client; and
   detecting the event comprises identifying when a second location associated with an input is encompassed by the span layer.

14. The non-transitory machine-readable storage medium of claim 8, wherein the instructions are configurable to cause the at least one processor to temporarily withhold the event data from the GUI element until after the event is authenticated.

15. A method of securing an action associated with a graphical user interface (GUI) element within a GUI display of an instance of a web application using a web application firewall between a client and an application server providing the instance of the web application to the client, the method comprising:
   injecting, by the web application firewall, one or more injected components into a file comprising one or more core web application components for the instance of the web application from the application server prior to providing a response to the client, the response comprising the file including the one or more injected components and the one or more core web application components, wherein the client executes the file to provide the one or more core web application components and the one or more injected components at the client;
   receiving, by the web application firewall, an authentication request from the one or more injected components at the client, wherein the one or more injected components are configurable to monitor a region associated with the GUI element associated with the action within the GUI display of the instance of the web application, detect an event associated with the GUI element within the region of the GUI display, and capture event metadata associated with the event within a context of the instance of the web application, wherein the authentication request comprises the event metadata;
   authenticating the event when the event metadata corresponds to authentication configuration metadata associated with the GUI element; and
   providing, by the web application firewall, indication the event is authenticated to the one or more injected components at the client, wherein the one or more injected components provide event data corresponding to the event to the GUI element to initiate the action in response to authenticating the event.

16. The method of claim 15, further comprising automatically establishing a communication channel between an injected component of the one or more injected components at the client and the web application firewall, wherein:
   receiving the authentication request comprises receiving the authentication request including the event metadata from the injected component via the communication channel; and
   providing the indication comprises providing an authentication response to the injected component including the indication the event is authenticated via the communication channel.

17. The method of claim 16, wherein automatically establishing the communication channel comprises the injected component automatically creating the communication channel in accordance with a WebSocket communications protocol in response to determining the GUI display includes the GUI element to be monitored.

18. The method of claim 15, wherein the one or more injected components are configurable to temporarily withhold the event data from a function associated with the GUI element until after the event is authenticated.

19. The method of claim 15, wherein the one or more injected components are configurable to monitor the region associated with the GUI element by generating a span layer encompassing the region associated with the GUI element within a browser application at the client.

20. The method of claim 19, wherein the span layer underlies the region associated with the GUI element within the browser application.

* * * * *